United States Patent [19]

Reece et al.

[11] Patent Number: 4,712,955
[45] Date of Patent: Dec. 15, 1987

[54] EXPANDABLE FASTENER ASSEMBLY

[75] Inventors: Marvin P. Reece, Dana Point; Jose Rosan, Jr., Newport Beach, both of Calif.

[73] Assignee: Rexnord Inc., Brookfield, Wis.

[21] Appl. No.: 734,416

[22] Filed: May 14, 1985

[51] Int. Cl.$^4$ .................................................. F16B 13/04
[52] U.S. Cl. ..................................... 411/17; 411/178; 411/438
[58] Field of Search .................................. 411/16–18, 411/178, 180, 289, 262, 251, 252, 318, 438; 285/318, 392; 405/259; 238/377; 138/89, 96 T

[56] References Cited

U.S. PATENT DOCUMENTS

| | | |
|---|---|---|
| 806,407 | 12/1905 | Farrington . |
| 806,408 | 12/1905 | Farrington . |
| 906,691 | 12/1908 | Chenoweth . |
| 1,199,624 | 9/1916 | Smith, Jr. . |
| 1,396,611 | 11/1921 | White .............................. 411/178 |
| 1,407,570 | 2/1922 | Peikce ............................... 411/17 |
| 2,036,604 | 4/1936 | Pickop . |
| 2,093,026 | 9/1937 | Bernhard . |
| 2,346,051 | 4/1944 | Seamark ............................. 411/17 |
| 2,363,789 | 11/1944 | Haas .................................. 411/438 |
| 2,512,316 | 6/1950 | Eckener . |
| 2,581,399 | 1/1952 | Forster . |
| 2,688,355 | 9/1954 | Forster . |
| 2,777,718 | 1/1957 | Vegren . |
| 3,018,684 | 1/1962 | Brancato . |
| 3,272,250 | 9/1966 | Hattan ............................... 411/262 |
| 3,515,027 | 6/1970 | Textrom . |
| 3,910,031 | 10/1975 | Keida . |
| 4,040,326 | 8/1977 | Breed . |

FOREIGN PATENT DOCUMENTS

| | | |
|---|---|---|
| 0021154 | 6/1980 | European Pat. Off. . |
| 0023404 | 7/1980 | European Pat. Off. . |
| 0140812 | 9/1984 | European Pat. Off. . |
| 2487453 | 1/1982 | France ................................ 411/17 |
| 559320 | 12/1971 | Switzerland . |
| 748338 | 4/1956 | United Kingdom ............... 411/17 |
| 1538261 | 3/1976 | United Kingdom . |

Primary Examiner—Neill Wilson

[57] ABSTRACT

The present invention provides an expandable fastener assembly for use in materials which cannot be successfully fastened by conventional screw threads. The assembly includes an insert (20) constructed as a coil to expand uniformly along its convolutions and thereby exert a force upon the adjacent material (50). A fastener (30) has outer threads compatible with the inner threads of the insert (20) such that when a tightening or seating torque is applied to the fastener (30) it is transferred to the insert (20). The transferred force expands the insert (20) outwardly with respect to the fastener (30), without rotation of the insert (20) relative to rotation of the fastener (30). The invention is also provided with an anti-rotation feature to secure the fastener from rotational movement after installation.

3 Claims, 13 Drawing Figures

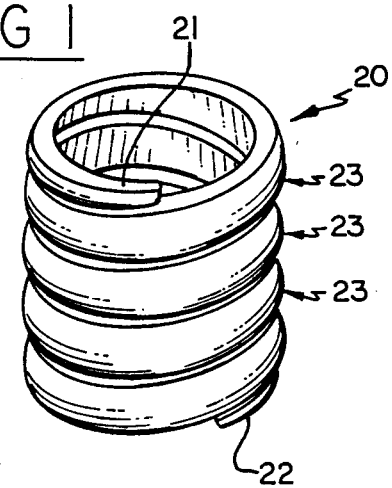
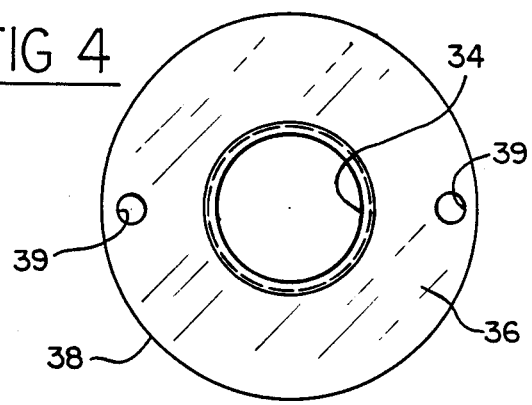
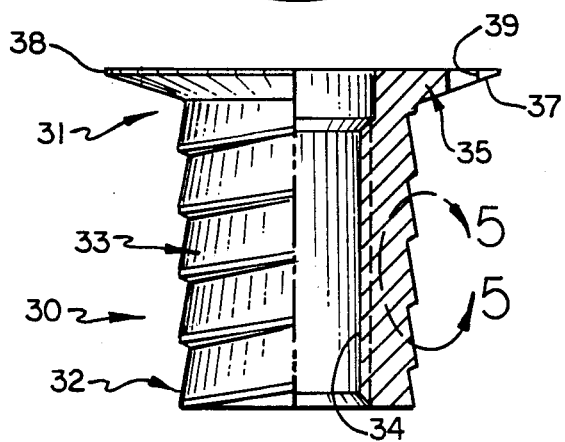
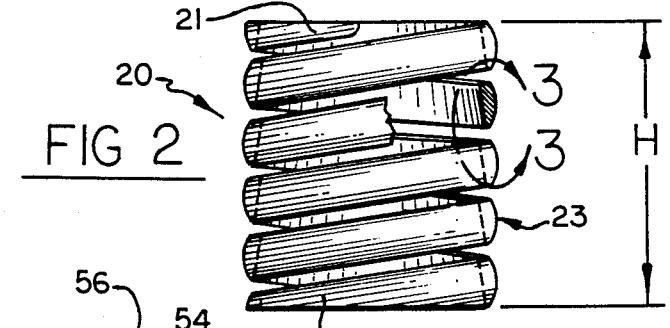
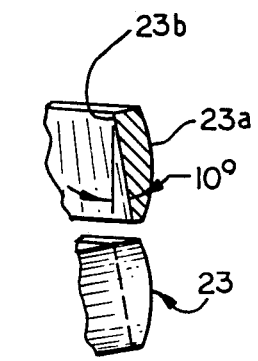
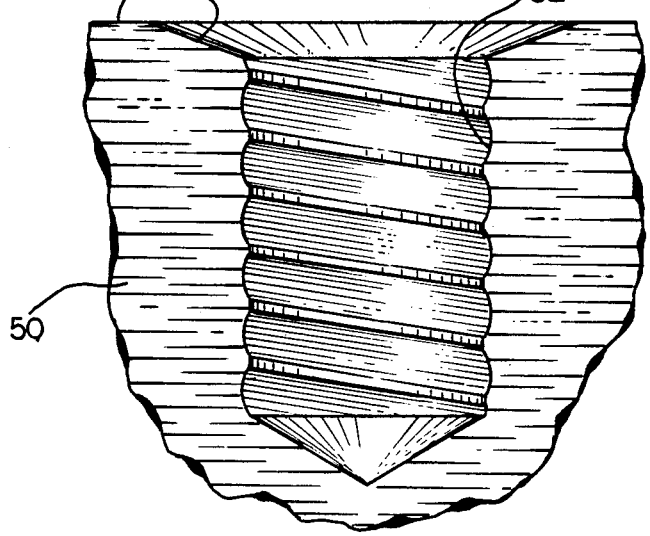

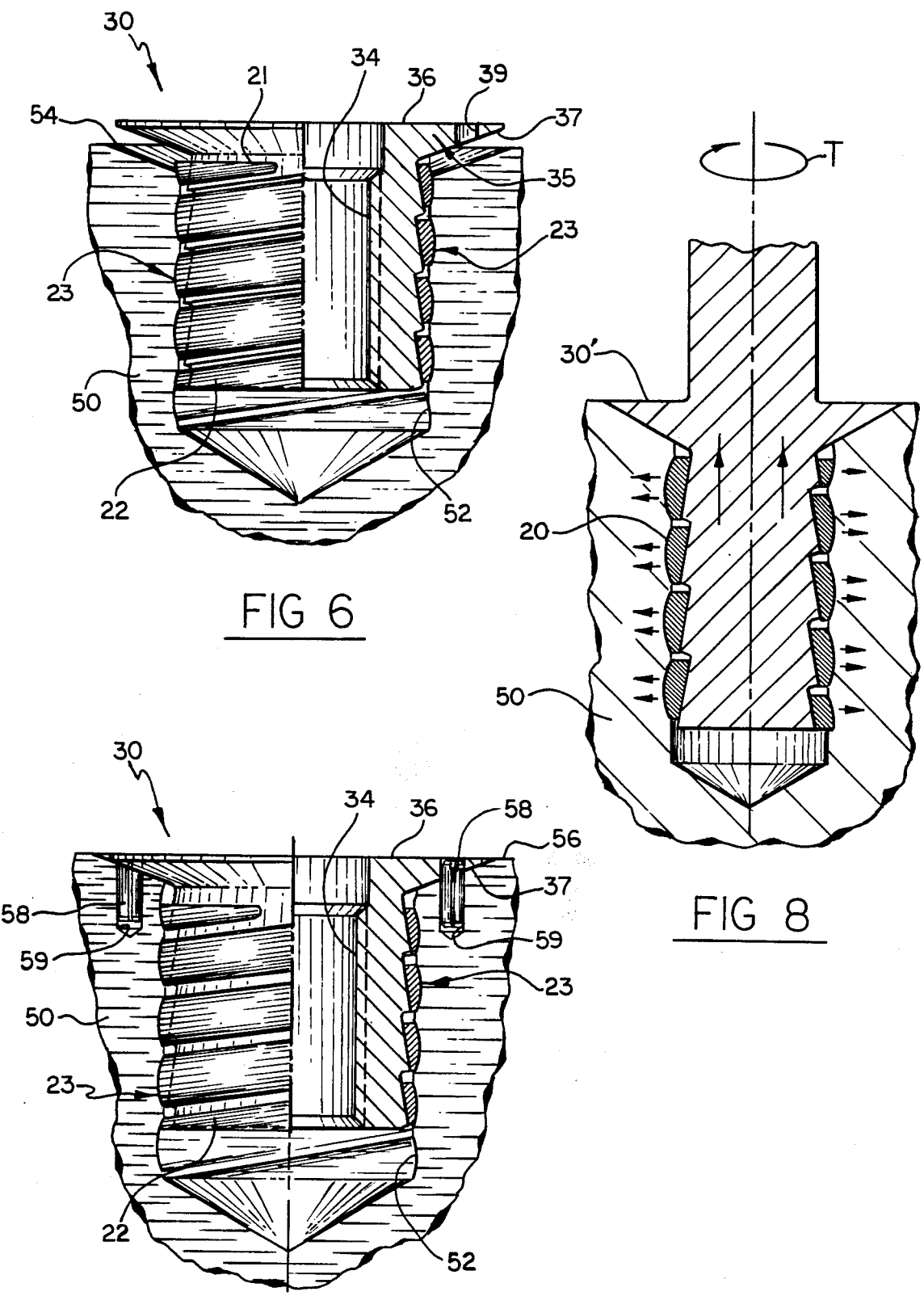

4,712,955

EXPANDABLE FASTENER ASSEMBLY

TECHNICAL FIELD

The present invention relates to inserts and studs for use in materials which cannot be successfully fastened by conventional screw threads due to the material's hardness or softness.

BACKGROUND

With the increasing use of materials such as composites and plastics, the need for a fastener which will not delaminate, split or otherwise damage the material has become apparent. However, the known prior art has been developed for and directed almost exclusively to fasteners for use in metal or non-composite materials, e.g., aluminum. Thus prior art fastener technology exists, but such technology is not directly applicable for universal use in all types of materials. Hence the need for a new fastener able to meet the particular needs of any industry regardless of the type of material the fastener is to be secured in.

SUMMARY

The present invention is for use in materials that cannot be successfully tapped with conventional screw threads. The invention assembly includes fastener and insert components. When installed the assembly of the invention exerts an external pressure upon the parent material which secures the assembly therein, and provides the user a pre-determined pullout strength.

The assembly is designed such that the fastener outer thread mates with the insert inner thread to expand the insert outwardly into the parent material as a seating torque is applied to the fastener. The outer thread of the insert expands uniformly into the opening in the parent material and exerts a compressive force upon the material in contact with the insert's outer thread form. The installed assembly is locked in the parent material against rotation by use of pins, serrations, or the like. These and other features of the invention may be understood in greater detail when the following description is read in conjunction with the accompanying drawings.

BRIEF DESCRIPTION OF THE DRAWINGS

FIG. 1 is a view in perspective of a preferred embodiment of a coil insert of the present invention.

FIG. 2 is an exploded view in elevation and partial cross-section of a preferred embodiment of a fastener and an insert of the present invention and the prepared opening in a material for same.

FIG. 3 is an enlarged view of a portion of the insert shown in FIG. 2.

FIG. 4 is a top plan view of the fastener shown in FIG. 2.

FIG. 5 is an enlarged view of a cross-section of the outer thread of the fastener shown in FIG. 2.

FIG. 6 is a view in cross-section of the present invention prior to expansion of the insert into the material.

FIG. 7 is a view in cross-section of the present invention as installed in the material.

FIG. 8 is a schematic view in elevation of the installed invention illustrating the directional forces acting when installation is completed.

DETAILED DESCRIPTION OF A PREFERRED EMBODIMENT OF THE PRESENT INVENTION

Figure 9:
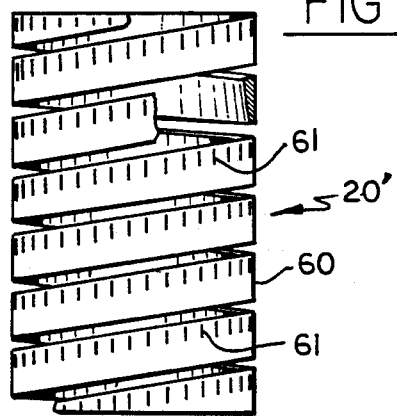
FIG. 9 is a view in elevation of a second embodiment of an insert of the present invention.
Figure 12:
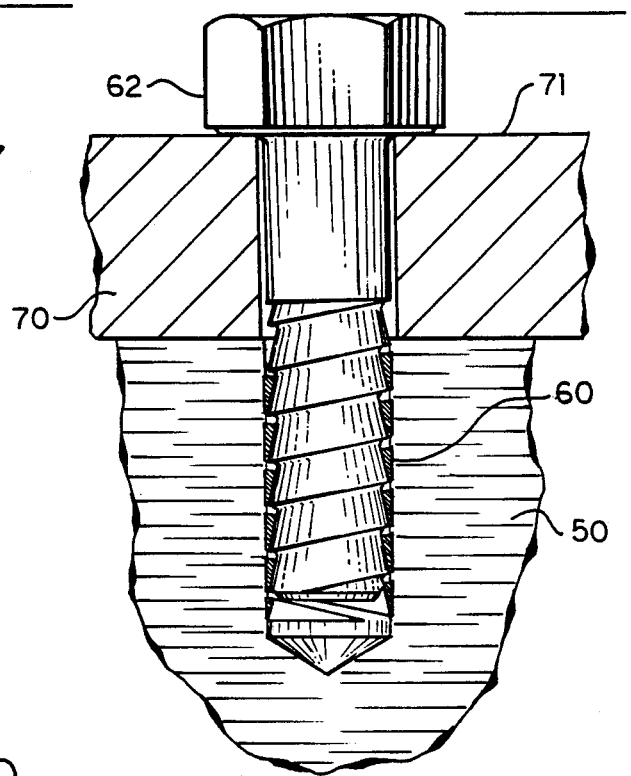
FIG. 12 is a view in elevation and partial cross-section of the second embodiment shown installed in a parent material.
Figure 10:
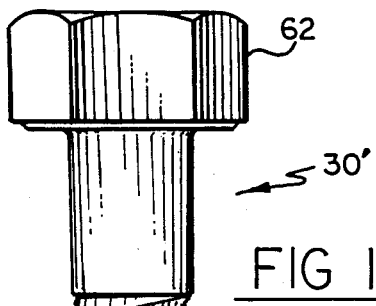
FIG. 10 is a view in elevation and partial cross-section of a second embodiment of a fastener and of the insert of the present invention shown in FIG. 9 prior to installation within a prepared opening in a material.

Referring now to the drawings, FIG. 1 illustrates the general appearance of the insert of a preferred embodiment for the present invention. FIG. 2 shows this insert along with a fastener and a prepared opening in a parent material. From FIGS. 1 and 2 it can be seen that the insert 20 is formed as a continuous, helical coil having a first or upper free end 21, a second or lower free end 22, and a plurality of thread convolutions 23 extending between the two ends 21, 22.

The insert 20 has an outer thread form defining an outer diameter and an inner thread form defining an inner diameter. The outer thread form 23a for each convolution is arcuate in that the surface is radiused relative to an imaginery longitudinal axis for the coil insert. The inner thread form 23b is a substantially flat, planar surface sloping downwardly and outwardly at approximately ten degrees with respect to a vertical line. See FIG. 3. The insert is constructed a pre-determined height dependent either upon the length of its mating fastener or the depth of the prepared opening. The outer diameter is preferably constant along the height H of the insert as is the inner diameter. The insert may be wire formed or machined from solid stock.

The coil insert 20 is constructed so as to be threadable onto a fastener. Thus the outer diameter of a portion of the fastener is preferably slightly smaller than the inner diameter of the coil insert to allow friction free, manual assembly of the two items. In FIG. 2 a fastener 30 compatible with the insert 20 illustrated. While a fastener of the insert type with internal threads is shown in the preferred embodiment, a stud-type fastener may also be used. The fastener 30 has an uppermost end 31, a lowermost end 32, a shank portion 33 having a plurality of outer thread convolutions extending between the two ends, and a centrally located, internally threaded bore 34. The uppermost end 31 is constructed so as to provide the fastener with a shoulder portion 35 having a flat top surface 36 and an inclined bottom surface 37 extending from the periphery of the shoulder to the uppermost threaded convolution of the fastener. In this embodiment the diameter of the shoulder portion 35 is greater than the outer diameter of the threaded shank portion 33. At a location on the shoulder 35 intermediate the peripheral edge 38 and the outer diameter of the threaded shank 33, at least one aperture 39 is provided which extends through the shoulder portion from the top surface 36 to the bottom surface 37. In the preferred embodiment a pair of apertures are provided opposite each other. See FIG. 4.

With reference to FIG. 5, it can be appreciated that the outer thread form of the fastener shank 33 is designed so as to mate with the inner thread form of the coil insert 20. The fastener outer thread form includes a substantially flat, planar surface 40 inclined inwardly and upwardly at approximately ten degrees with respect to a vertical line. Connecting the flat planar surfaces 40 to each other are connecting portions 41 which are relatively short compared to the planar surfaces 40. It will be appreciated from a comparison of FIGS. 3 and 5 that the outer thread form of the fastener is thus compatible with the inner thread form of the insert in that the surfaces of the two thread forms will mate in view of the selected angle of inclination, i.e. ten degrees. Depending upon the relative hardness of the parent material this angle of inclination in the illustrated embodiments may vary.

The parent material 50 for the preferred embodiment is prepared as shown in FIG. 2 by tapping a hole of pre-determined depth with a thread form 52 compatible with the outer thread of the insert 20. The uppermost portion 54 of the tapped hole is countersunk to receive the shoulder portion 35 of the fastener so that the top surface 36 of the installed fastener will lie flush with the adjacent surface 56 of the parent material 50. The type of parent material used will dictate the materials which are suitable for constructing the insert and the fastener, thus no particular materials are preferred for the present invention. Turning now to FIGS. 6, 7, and 8 the installation and operation of the present invention may be explained.

Prior to installation the parent material is prepared by tapping a hole therein of a size and shape to receive the fastener with the coil insert threaded thereon. The tapped thread is such as to mate with the outer thread of the installed insert 20. The coil insert 20 is threaded on to the fastener 30 and together the assembly is loosely threaded into the prepared opening or tapped hole to a position as shown in FIG. 6. At this point in the installation procedure the fastener shoulder portion 35 preferably has not yet contacted the parent material, nor has the coil insert 20 expanded outwardly relative to its initial arrangement upon the fastener. Further rotational force applied to the fastener causes the shoulder portion of the fastener to settle into and contact the countersunk opening 54 of the material 50. Once this has occurred a tightening or seating torque T is applied as further rotation of the insert and fastener assembly is attempted. As the seating torque T is applied, the coil insert expands outward with the insert inner thread moving along the mating outer thread of the fastener as the fastener thread helix is caused to rotate in relationship with the fastener shoulder 35. Simultaneously with the upward movement of the insert inner thread, the insert outer thread moves outwardly into contact with the tapped hole of the parent material. The seating torque thus causes the coil insert to exert an outward force which essentially compresses the parent material it contacts. See FIG. 8. When the desired torque has been applied, a pin 58 may be driven through each aperture 39 of the fastener and into an underlying prepared opening 59 in the parent material to prevent the installed assembly from rotating. The insert and fastener assembly of the present invention is thus locked into the parent material.

From the foregoing a number of the unique features of the present invention can be appreciated. The full thread form of the coil insert is uniformly expanded as a result of the ramp effect between the mating insert inner thread and the fastener outer thread. The angle at which these threads are formed is relatively shallow, e.g., ten degrees. As a result a better outward thrust for expanding the insert outwardly into the parent material is provided. The expansion of the coil insert is constant and uniform as the seating torque is applied to the fastener because of the unique thread forms provided by the invention. The insert expands outwardly. It does not rotate as the fastener is rotated during installation. The invention provides to the user an insert and fastener assembly which may be reliably secured in whatever material is selected.

FIGS. 9–13 illustrate a second embodiment for the present invention. Briefly this embodiment differs from the preferred embodiment in that the outer thread form 60 for the coil insert is not arcuate in shape but rather parallel with respect to an imaginary longitudinal axis for the insert. Further this outer thread from 60 is provided with a number of serrations 61 spaced along the length of the coil convolutions. The opening in the parent material for receiving the fastener is not tapped but is instead a bored or molded hole of a diameter which is slightly larger than the outer dimeter of the coil insert, such that the insert may be loosely received therein apart from the fastener without binding.

Figure 11:
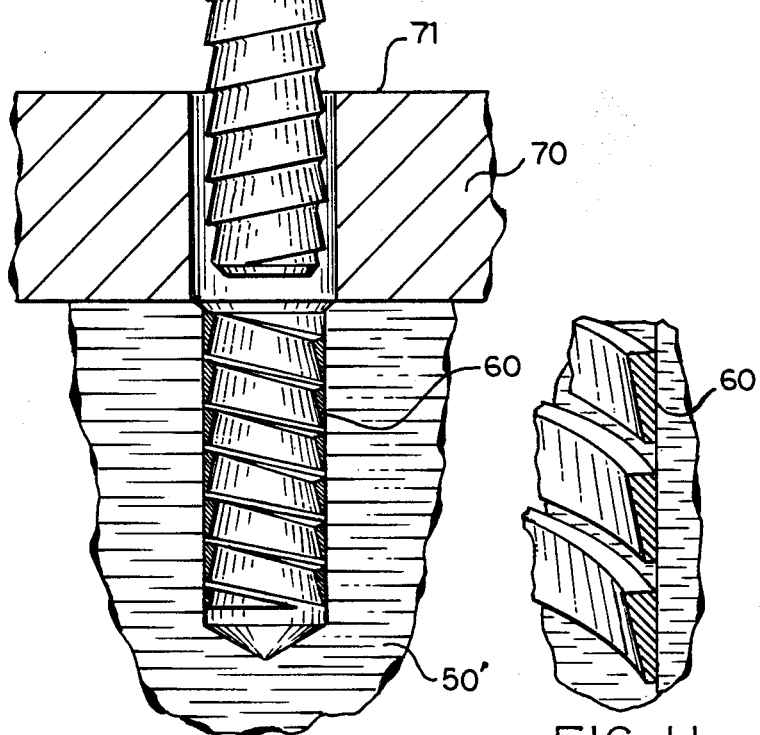
FIG. 11 is an enlarged view in cross-section of a portion of the insert shown in FIG. 10.
Figure 13:
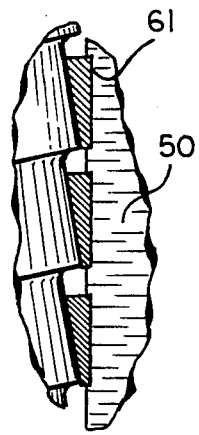
FIG. 13 is an enlarged view in cross-section of the insert of the second embodiment shown in FIG. 13 as expanded into the material.

To install the second embodiment the coil insert 20' is first placed into the prepared hole. The insert would appear relative to the side wall of the bored hole as shown in FIG. 11, i.e., flush but not secured. A thread compatible fastener 30' is then threaded into the coil insert with the outer thread of the fastener mating with the inner thread of the coil insert in the same manner as shown for the preferred embodiment. See FIG. 13. As the bottom surface of the bolt fastener head 62 contacts the surface 71 of the structure 70 being secured to the underlying parent material 50', further rotation of the bolt head 62 will exert a tightening torque upon the insert and fastener assembly. Accordingly this torque yields the above-discussed ramp effect between the fastener and insert, with the insert expanding outward into the parent material 50' as the inner threads of the insert move along the fastener outer threads. As can be seen in FIG. 13, when the pre-determined torque has been achieved, the insert will have expanded sufficiently relative to the fastener to embed at least a portion of its outer threads into the parent material. The serrrations 61 contained on the outer threads provide an anti-rotation feature for this embodiment.

Of course further embodiments may be possible to one skilled in the art in view of the above description, thus the invention is believed to be limited in scope not by the two described embodiments but rather limited only by the claims which follow.

What is claimed is:

1. An expandable fastener assembly for use in a prepared opening in a parent material, said assembly comprising:

an insert formed as a continuous, expandable, helical coil, with said coil forming an outer thread and an inner thread and having a uniform outer diameter;

a fastener having a portion with an outer thread thereon, said fastener being constructed for threadable engagement with said insert inner thread;

said insert outer thread constructed so as to secure said insert within an opening in a parent material when said insert is expanded thereinto; and means for uniformly expanding said insert and securing said fastener relative to said insert inner thread, said means including said insert inner thread having a helical surface inclined at approximately ten degrees with respect to a vertical axis, with said fastener outer thread having a like thread form for mating with said insert inner thread creating a ramp effect therebetween when a tightening torque is applied to said fastener.

2. The expandable fastener assembly of claim 1 wherein said insert outer thread has an arcuate-shaped thread form and the prepared opening in the parent material is tapped with a thread form compatible with said arcuate-shaped thread form of said insert outer thread.

3. An expandable fastener assembly for use in a tapped hole of a material, said assembly comprising:

an insert formed as a continuous, expandable, helical coil, with said coil forming an outer thread and an inner thread;

a fastener having a portion with an outer thread thereon, said fastener being constructed for threadable engagement with said insert inner thread;

said insert outer thread including first means for securing portions thereof within a tapped hole when said insert expands thereinto, said securing means including said outer thread having an arcuate-shaped thread form, and second means for uniformly expanding said insert and securing said fastener relative to said insert inner thread, said second means including said insert inner thread having a helical surface inclined at approximately ten degrees with respect to a vertical axis, with said fastener outer thread having a like thread form for mating with said insert inner thread creating a ramp effect therebetween when a seating torque is applied to said fastener.

* * * * *